United States Patent [19]

Yamasaki

[11] Patent Number: 5,129,085
[45] Date of Patent: Jul. 7, 1992

[54] COMPUTER NETWORK WITH SHARED MEMORY USING BIT MAPS INCLUDING FLAGS TO INDICATE RESERVED MEMORY AREAS AND TASK STATUS

[75] Inventor: Akiko Yamasaki, Kanagawa, Japan

[73] Assignee: Mitsubishi Denki Kabushiki Kaisha, Japan

[21] Appl. No.: 318,750

[22] Filed: Mar. 3, 1989

[30] Foreign Application Priority Data

Mar. 31, 1988 [JP] Japan .................. 63-79505

[51] Int. Cl.⁵ .................................. G06F 11/34
[52] U.S. Cl. .......................... 395/650; 364/281.7; 364/281.8; 364/285; 364/264.4; 364/DIG. 1; 395/575
[58] Field of Search ....... 364/200 MS FILE, 900 MS File; 371/7, 12, 14, 66; 395/650, 575

[56] References Cited

U.S. PATENT DOCUMENTS

| | | | |
|---|---|---|---|
| 4,037,215 | 7/1977 | Birney | 364/200 |
| 4,084,228 | 4/1978 | Dufond | 364/200 |
| 4,128,881 | 12/1978 | Yamamoto | 364/200 |
| 4,130,865 | 12/1978 | Heart | 364/200 |
| 4,187,538 | 2/1980 | Douglas | 364/200 |
| 4,224,664 | 9/1980 | Trinchieri | 364/200 |
| 4,347,409 | 2/1983 | Bienvenu | 364/200 |
| 4,425,616 | 1/1984 | Woodell | 364/200 |
| 4,458,307 | 7/1984 | McAnlis | 364/200 |
| 4,479,195 | 10/1984 | Herr | 364/900 |
| 4,539,655 | 9/1985 | Trussell | 364/900 |
| 4,564,903 | 1/1986 | Guyette | 364/200 |
| 4,636,947 | 1/1987 | Ward | 364/200 |
| 4,697,266 | 9/1987 | Finley | 364/200 |
| 4,742,450 | 5/1988 | Duvall | 364/200 |
| 4,847,749 | 7/1989 | Collins | 364/200 |
| 4,868,738 | 9/1989 | Kish | 364/200 |
| 4,868,832 | 9/1989 | Marrington | 364/200 |
| 4,914,583 | 4/1990 | Weisshaar | 364/200 |
| 4,937,777 | 6/1990 | Flood | 364/900 |

*Primary Examiner*—David Y. Eng
*Assistant Examiner*—Eric Coleman
*Attorney, Agent, or Firm*—Wolf, Greenfield & Sacks

[57] ABSTRACT

The present invention offers an improved type of shared memory area management system for use in a network system which includes a main computer accessed through a plurality of terminals and a memory area provided in said main computer the use of which is shared by said terminals, wherein the memory area is divided into a plurality of delimited areas, and wherein are provided a first bit map and a second bit map each including a plurality of flag areas corresponding to the delimited areas and adapted to show the state of shared use of the areas in such a manner that, when it is necessary to reserve or release any one of the delimited areas for processing a task by way of any one of the terminals, the state of a corresponding flag area in the first bit map may be changed, and that when such task in the delimited area is determined to be completed, the state of corresponding flag area in the second bit map may be changed accordingly.

9 Claims, 4 Drawing Sheets

Fig. 3  ERASION OF A TRANSACTION

COMPUTER NETWORK WITH SHARED MEMORY USING BIT MAPS INCLUDING FLAGS TO INDICATE RESERVED MEMORY AREAS AND TASK STATUS

BACKGROUND OF THE INVENTION

The present invention relates to a storage management system, and more particularly to a system for managing shared memory area for use in a network system wherein an electronic computer is accessed from a multiplicity of terminals.

It has been general practice to use a transaction system adapted to access a main electronic computer with a high speed throughput and equipped with a mass storage capacity through a multiplicity of terminals by way of public service networks.

FIG. 4 shows the general construction of a common transaction system in which information is fed into a computer 3 from a terminal A through a line 2 and a switching center exchange 1, the computer 3 processing such information and the result thereof being sent to the terminal A or to other terminals B, C. It is a typical characteristic of such a transaction system that information may be applied at random from a plurality of terminals A, B, C, and that such information must be processed with limited resources such as the line 2 and the computer 3.

For example, when different items of information are input at the same time from three terminals A, B, C, three transactions are concurrently processed within the computer 3. With such an arrangement, as these three transactions are in principle effected independently of each other, use of a main memory 4 may be shared for all of these transactions. In this operation, the management and control of main memory 4 is performed according to a Table A for flags as set in the main computer 3. In general, the transaction system has the following specific properties:

(1) A transaction may not be deterministic in terms of processing until it is completed.

(2) A transaction is independent in nature, and is not influenced by the processing of any other transaction.

(3) When any abnormal situation occurs before one transaction is completed, it is essential to return the state of processing to that which existed before that particular transaction started. (Cancellation of a transaction)

(4) It is essential to cancel all transactions that have not been completed when the system goes down.

Let us consider a case where the main memory 4 comprises a multiplicity of memory areas and the terminals A, B and C share one Table B in such areas. When it is desired to use any one of the memory areas of Table B which is divided into segments numbered 1 to 12, the CPU refers to Table A.

In this arrangement, the segments 1 through 12 of Table A may correspond to those numbered 1 through 12 of Table B, respectively. If a certain part of Table B is being used by the terminal A, a corresponding area of Table A is assigned "1", and if a certain part of Table B is not yet being used or is released, a corresponding area of Table A is assigned "0". An item of information contained in Table A is either "1" or "0", which means 1 bit will do. This Table A is called a bit map, and assignment of the value "1" is referred to as "putting up a flag", while assignment of the value "0" is called "putting-down a flag". The CPU searches Table A for any areas to which "0" has been assigned, putting up a flag there for use of the corresponding part of Table B. In this manner, it is possible in practice to avoid any overlapping use of the areas in Table B. When a transaction from for example, terminal A has been satisfactorily completed, CPU may continue to reserve or release the shared area, but when that transaction is completed in an abnormal condition, it is essential to return the state of the shared area to the one that existed before the transaction was started. Moreover, it is necessary with this transaction system to clear information on any transaction which has not been completed when the system goes down, and information on any transaction that has been completed must be held. However, according to the conventional system in which a flag is put up for Table A while a transaction is being conducted to prevent any possible conflict from occurring, it is not possible to put down a flag when the system is down. This causes an undesirable misalignment of the system.

In an attempt to resolve the inconveniences noted above, the present invention is essentially directed at providing an improved kind of shared memory area management system capable of preventing misalignment in a network system under any operating conditions, and yet which does not involve any reduction in the throughput capacity of the network system.

SUMMARY OF THE INVENTION

According to one aspect of the present invention an arrangement is provided in the manner shown in FIG. 1 wherein a main memory area 12 is divided into a plurality of delimited areas and a first bit map 10 and a second bit map 11 each include a plurality of flag areas corresponding to these delimited areas and are adapted to show the state of shared use of these areas so that when it is required to reserve or release any one of these delimited areas 1 through 20 for the purpose of processing a task through any one of terminals A, B and C, the state of a corresponding flag area in the first bit map 10 may be changed (Steps S3 and T3 in FIGS. 2 and 3), the state of a corresponding flag area in the second bit map 11 being changed (Steps S5 and T5 in FIGS. 2 and 3) when such task in the delimited area is determined to be completed. With such an arrangement, the information on flags in the second bit map 11 cannot be lost even though information on flags in the first bit map 10 may be lost at the time of a system down, whereby any misalignment in the management of the memory areas being shared can be avoided. This enables conflicts between a plurality of transactions being conducted with use of a shared area to be avoided and thus access to the shared area can be used efficiently.

More specifically, according to another aspect of this invention, an arrangement is provided wherein a memory area is divided into a plurality of delimited areas, and the first bit map and the second bit map comprise a plurality of flag areas corresponding to individual delimited areas and depicting the current state of shared use thereof, so that when it is required to reserve or release such delimited areas for the processing of a task through any one of a plurality of terminals, the state of a corresponding flag area in the first bit map may be changed, while when the task in that delimited area is determined to be completed, the state of a corresponding flag area in the second bit map may be changed. This allows information on the management of the memory area at a time when the system goes down to be well grasped, which benefits the performance of the entire network and obviates the need for a lock system to prevent conflicts, reduces overheads for the operating system, and avoids the necessity for transactions to wait for operation time.

Other aspects and advantages of the present invention will become apparent from the detailed description given below when considered in conjunction with the accompanying drawings.

DETAILED DESCRIPTION OF THE PREFERRED EMBODIMENTS

In order that the present invention may be clearly understood, preferred embodiments will be described by way of example with reference to the accompanying drawings.

Figure 1:
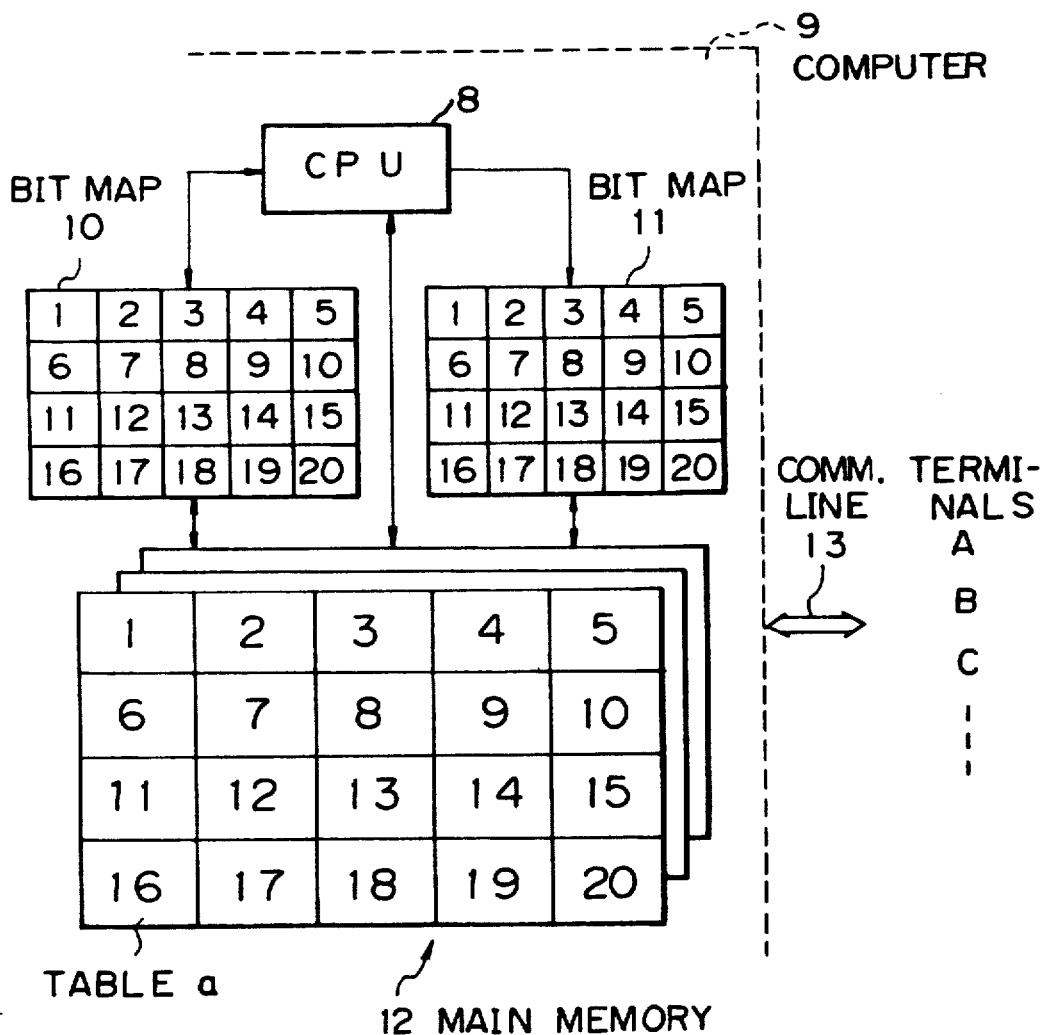
FIG. 1 is a schematic view showing the general construction of a network system embodied in accordance with the present invention.

FIG. 1 shows a computer designated by reference numeral 9 comprising a central processing unit (CPU) 8, two bit maps 10 and 11 for the representation of flags provided in the work area of a memory, and a main memory 12, the computer being connected operatively to a plurality of terminals A, B, C . . . through a line 13. The use of main memory 12 may be shared for writing, reading and erasing operations by terminals A, B, C . . ., all transactions being controlled by the CPU 8. Let us now consider a case wherein a Table "a" in the main memory 12 is shared as a common memory area for a plurality of transactions.

The arrangement is such that, for example, Table "a" consists of delimited areas 1 through 20, and that the bit maps 10 and 11 consist of a number of flag areas (regions) corresponding to the delimited areas 1 through 20. The bit map 11 is a flag area the state of which may change when the state of use in the delimited area of Table "a" is determined. As a consequence, when a writing transaction is completed, the bit map 11 may put up the flag of a corresponding bit in the delimited area of Table "a" which is being used by the CPU 8. When this transaction ends in an abnormal condition, no change in the flag operation occurs. Incidentally, when an erasing transaction for releasing the contents of a delimited area ends in a normal condition, the flag for the bit corresponding to that area may be put down.

On the other hand, the bit map 10 is for temporary use. Thus, if the CPU 8 is using an area which is to be reserved for or released from a terminal during a transaction being conducted at the time of this reserve or release operation, the state of a flag which can respond quickly is to be changed accordingly. When the transaction ends in an abnormal condition, the flag may return to the state that existed before the transaction started. When the system goes down, the state of the bit map 11 is to be restored to that which existed before the system went down, and the state of the bit map 10 is to be copied with the contents of the bit map 11 held at the state subsisting when the system went down.

Figure 2:
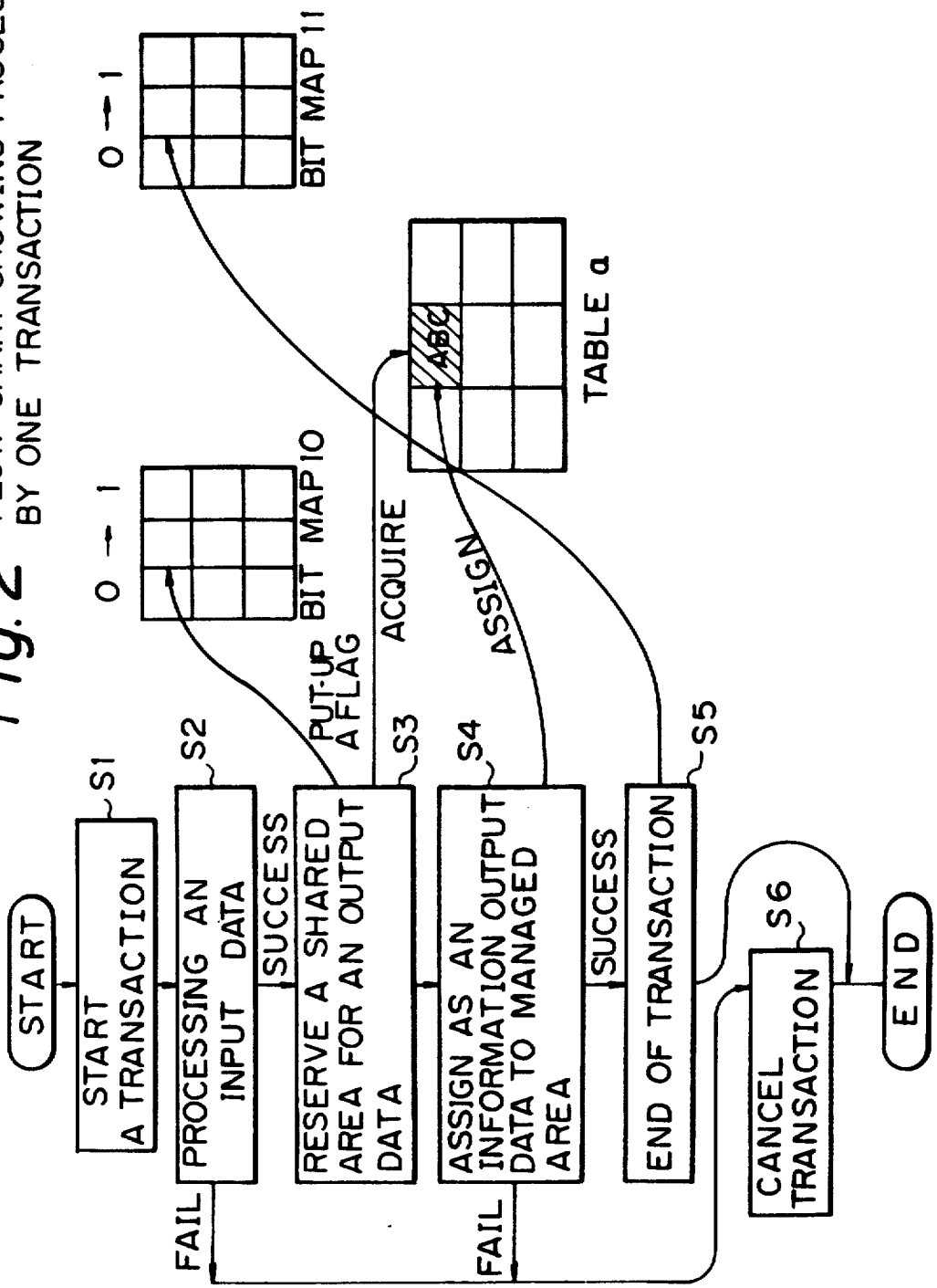
FIG. 2 is a flow chart showing a writing operation of a shared memory area management system according to the present invention.

An explanation will now be given of the operation procedure in which a flag is put up and down in the bit maps 10 and 11 with reference to the flow charts shown in FIGS. 2 and 3. FIG. 2 shows a case where a transaction from the terminal A causes data ABC to be written into Table "a".

Firstly, in Step S1, a transaction is started upon receipt by the CPU 8 of access from the terminal A. Since the terminal A requires the computer 9 to perform a certain task, the CPU 8 operates to interpret what request is represented by the data input in Step S2. A predetermined processing time is required for the operation conducted in this step. If the CPU succeeds in the data interpretation operation, the process goes to Step S3, where preparations are made for writing into Table "a" for writing data to be output after later processing, by having CPU 8 inspect the bit map 10 and putting up a flag for the purpose of using an area of, for example, a delimited area 2 which has no flag up. This operation allows the delimited area 2 in Table "a" to be reserved. In Step S4, the CPU 8 performs the required processing to make the output data ABC which is to be assigned (written) to the delimited area 2 of Table "a". If this writing operation succeeds, the process proceeds to Step S5 where the CPU 8 puts up flag 1 in a corresponding delimited area 2 in the other bit map 11, whereupon this transaction is terminated. This represents establishing the state of use of the delimited area 2 of Table "a", and further transactions are prohibited from using this delimited area 2.

In Step S2, if the CPU 8 fails in its interpretation of input data because of a system down or the like, the process goes to Step S6, cancelling the transaction. At this moment no flag is put up in the delimited area 2 in either of the bit maps 10 and 11 as this area may be utilized when the transaction resumed. If in Step S4 the operation of writing into the delimited area 2 of Table "a" fails because of a system down or the like, the process proceeds to Step S6, cancelling the transaction. In this situation, it is to be noted that a flag put up in the bit map 10 is now put down, and that no flag is yet put up in the bit map 11. In this case, the delimited area 2 may also utilized too.

Figure 3:
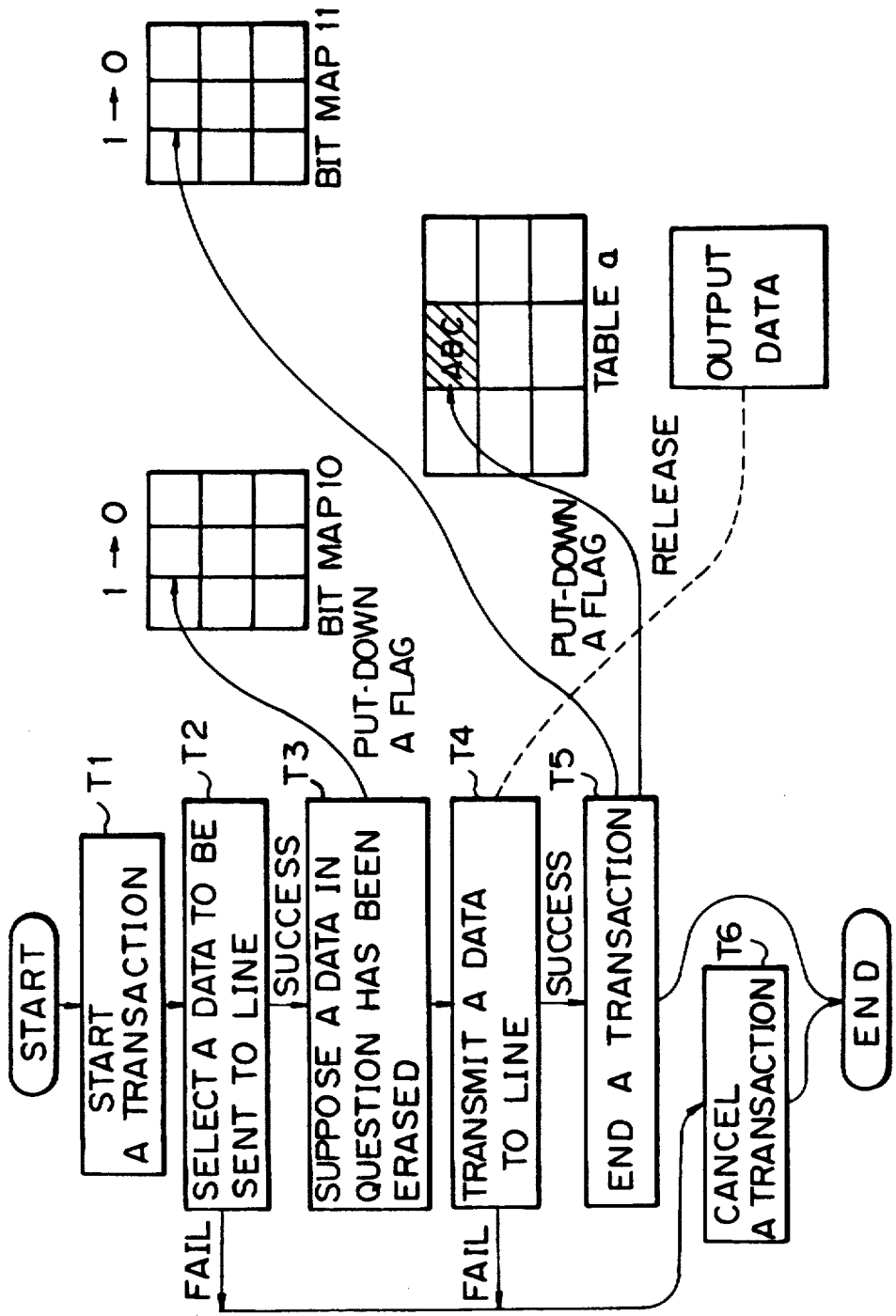
FIG. 3 is a flow chart showing an erasing operation of the present invention.
Figure 4:
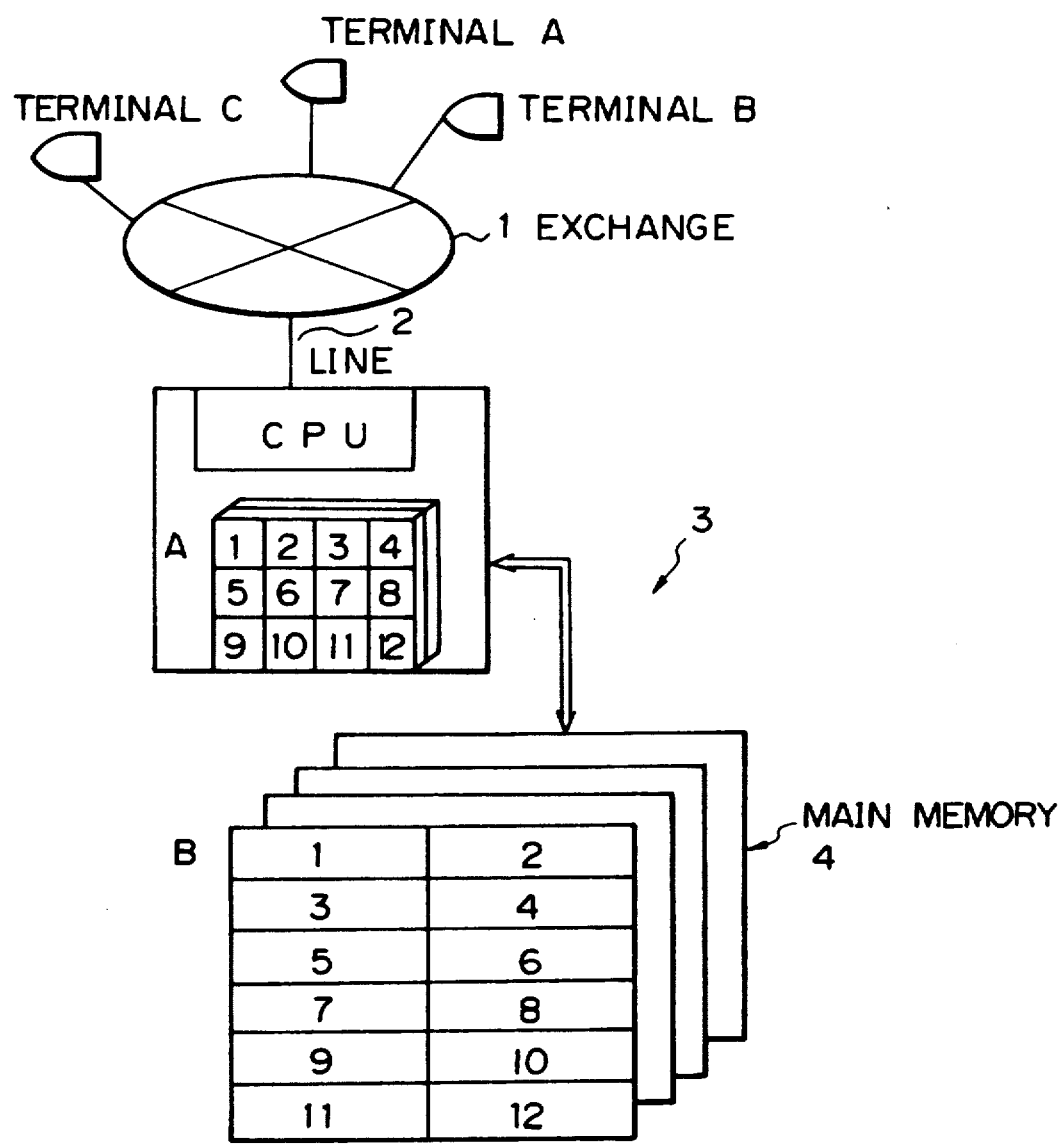
FIG. 4 is a schematic view showing the construction of a conventional network system.

FIG. 3 is a flow chart showing how the process operates to erase the data ABC in the delimited area 2 of Table "a", and to release this same area.

Firstly, in Step T1, the CPU 8 accepts an access from terminal A to start a transaction. The terminal A requests transmission of data ABC, and the CPU 8 selects this data ABC in Step T2 from an appropriate area in Table "a". Upon finding that this data ABC exists in the delimited area 2 of Table "a", the process goes now to Step T3 where this data ABC is to be erased, thus putting down the flag representing the corresponding delimited area 2 of the bit map 10 (changing the value "1" to "0"). Next, in Step T4, the the CPU 8 reads this data ABC from Table "a", allowing it to be sent to the terminal A by way of the line 13. If this delivery is completed normally, the process proceeds to Step T5, where the transaction is terminated, and the CPU 8 now operates to put down the flag in the bit map 11 (changing "1" to "0"). With this step, as there is no flag up in the delimited area 2 of either of the bit maps 10 and 11, if the data ABC leaves, the delimited area 2 of Table "a" this area will then become available for use at the time of the next transaction, since this data is no longer required. If in Step T2 the data ABC cannot be located because of a system down or similar failure, the process proceeds to Step T6, cancelling the transaction. In this case, as flags are put up in both of the bit maps 10 and 11, the delimited area 2 of Table "a" cannot be used in connection with other transactions. If a data transfer operation fails in Step T4 the process proceeds to Step T6 where the transaction is cancelled. In this state, there is no flag up in the bit map 10 (the value is "0"), while there is a flag up in the bit map 11 (the value is "1"). Thus the CPU 8 detects the state wherein the transaction conducted on the part of the terminal A now ends in an abnormal condition, and the delimited area 2 of Table "a" is not permitted to be used for any other transaction.

Consequently, in a case where the terminal B accesses the computer 9 to perform a transaction, only an area that can satisfy the following two conditions is selected when attempting to reserve for use any one delimited area in Table "a" of the main memory 12, that is:

(1) that it is not occupied by any other transaction.

(2) that any release operation for another transaction is over.

Otherwise, when seeking a free area solely by considering the flag state of the bit map 10, the condition (1) may, for instance, be met, but if Step T4 of FIG. 3 fails, there is a possibility that an area in the process of being released may be reserved. In other words, when transaction conducted by terminal A which is making performing a release operation ends in an abnormal condition, there may very possibly be damage of the data ABC before it is released, thus making it impossible to have it restored. On the other hand, when seeking a free area by way of the bit map 11 only, if Step S4 of FIG. 2 fails, an area which had been reserved once for writing with respect to the transaction for the terminal A prior to termination may very possibly be reserved improperly in duplicate.

In this respect, it is seen that if an area is acquired with no flag in either of the bit maps 10 and 11, taking a logical product or AND of the current flag state in the bit maps 10 and 11, either of the conditions (1) and (2) may be satisfied. Accordingly it is now possible in practice to attain proper management of shared memory area with no conflict in terms of access to one and the same area.

In this connection, it is advantageous for the content of the bit map 11 containing information on a transaction which is eventually determined to be terminated to be dully copied into the bit map 10 at the occasion of a system down, allowing the process to proceed free from any undesired misalignment in the management of the shared memory area in a network system.

While the transaction system has been described herein by reference to a preferred embodiment of the invention, it is of course possible in practice for similar advantageous effects to be obtained when a plurality of tasks have common access to a certain area, provided that it is a system that requires restoration of operations.

It is to be understood that the appended claims are intended to cover all of such generic and specific features particular to the invention as are disclosed herein and all statements relating to the scope of the invention which as a matter of language might be said to fall thereunder.

What is claimed is:

1. A shared memory management system for use in a computer network comprising:
   a central processor;
   a plurality of terminals coupled to said central processor;
   a main memory, divided into a plurality of delimited areas, said main memory being shared by a plurality of tasks associated with said terminals and executing on said processor;
   a first means comprising a first bit map, divided into a plurality of binary flags, each of said flags corresponding to one of said delimited areas in said main memory, for indicating whether each of said delimited areas is reserved by one of said tasks executing on said processor; and
   second means comprising a second bit map, divided into a plurality of binary flags, each of said flags corresponding to one of said delimited areas in said main memory, for indicating whether said one task has completed, said second means including means for maintaining the status of task completion upon loss of power by said computer network.

2. The shared memory management system of claim 1 wherein said first means further comprises means for setting each of the first bit map flags to a first state when said corresponding delimited area is reserved by said one task and for setting each of the first bit map flags to a second state when said corresponding delimited area is released by said one task.

3. The shared memory management system of claim 1 wherein said second means further comprises means for setting each of the second bit map flags to a first state when said task is currently executing on said processor and for setting each of the second bit map flags to a second state when said one task is complete.

4. The shared memory management system of claim 1 including means intercoupling said main memory and said first bit map in a manner so that respective flags of said first bit map are each responsive to a corresponding delimited area of main memory at which a task is being performed, and means intercoupling said main memory and said second bit map in a manner so that respective flags of said second bit map are each responsive to the completion of a task assigned to a corresponding delimited area of main memory.

5. A shared memory management system for use in a computer network comprising: a central processor;
   a plurality of terminals coupled to said central processor;
   a main memory, divided into a plurality of delimited areas, said main memory being shared by a plurality of tasks associated with said terminals and executing on said processor;
   a first means comprising a first bit map, divided into a plurality of binary flags, each of said flags corresponding to one of said delimited areas in said main memory, for indicating whether each of said delimited areas is reserved by one of said tasks executing on said processor, said first means further comprises means for setting each of said flags to a first state when the corresponding delimited area is reserved by said task and for setting each of said flags to a second state when the corresponding delimited area is released by said task; and
   second means for indicating whether said one task has completed, said second means including means for maintaining the status of task completion upon loss of power by said computer network.

6. A shared memory management system for use in a computer network comprising;
   a central processor;
   a plurality of terminals coupled to said central processor;

a main memory, divided into a plurality of delimited areas, said main memory being shared by a plurality of tasks associated with said terminals and executing on said processor;

a first means for indicating whether each of said delimited areas is reserved by one of said tasks executing on said processor; and second means comprising a second bit map, divided into a plurality of binary flags, each of said flags corresponding to one of said delimited areas in said main memory, for indicating whether said one task has completed, said second means further comprises means for setting each of said flags to a first state when said task is currently executing on said processor and for setting said flags to a second state when said task is complete, said second bit map including means for maintaining the status of task completion upon loss of power by said computer network.

7. In a shared memory management system for use in a computer network system including a processor coupled to a plurality of terminals and a main memory divided into a plurality of delimited areas, said memory shared by a plurality of tasks associated with said terminals and executing on said processor, the improvement comprising:

a first bit map means, divided into a plurality of first flags, each of said first flags corresponding to one of said delimited areas in said main memory, for indicating whether a delimited area is temporarily reserved by a task currently executing on said processor; and a second bit map means, divided into a plurality of second flags, each of said second flags, corresponding to one of said delimited areas in said main memory, for indicating whether said task utilizing said delimited area is complete said second bit map means being capable of retaining the status of each of said plurality of second flags upon loss of power by said computer network system.

8. In a shared memory management system, the improvement according to claim 7, wherein said first bit map means comprises means for setting each of said first flags to a first state when the corresponding delimited area is reserved by a task executing on said main processor and for setting each of said first flags to a second state when the corresponding delimited area is released by said task executing on said processor.

9. In a shared memory management system, the improvement according to claim 8, wherein said second bit map means comprises means for setting each of said second flags to a first state when said task is currently executing on said main processor and for setting said second flags to a second state when said task is complete.

* * * * *